(12) United States Patent
Maeng et al.

(10) Patent No.: US 9,344,293 B2
(45) Date of Patent: May 17, 2016

(54) APPARATUS AND METHOD FOR PROCESSING MULTIPLE INPUTS OF USERS OF A HOME NETWORK

(75) Inventors: Je-Young Maeng, Gyeonggi-do (KR); Joo-Yeol Lee, Seoul (KR); Se-Hee Han, Seoul (KR); Dong-Shin Jung, Gyeonggi-do (KR); Fei Fei Feng, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 546 days.

(21) Appl. No.: 12/902,881

(22) Filed: Oct. 12, 2010

(65) Prior Publication Data

US 2011/0087788 A1 Apr. 14, 2011

(30) Foreign Application Priority Data

Oct. 12, 2009 (KR) .................. 10-2009-0096911
Jan. 8, 2010 (KR) .................. 10-2010-0001932

(51) Int. Cl.
*G06F 15/16* (2006.01)
*H04L 12/28* (2006.01)

(52) U.S. Cl.
CPC .......... *H04L 12/281* (2013.01); *H04L 12/2809* (2013.01); *H04L 12/2816* (2013.01)

(58) Field of Classification Search
CPC ............... H04L 12/2809; H04L 29/08648; H04L 12/2816; H04L 12/281; G06F 15/16
USPC ...................................... 327/55, 65
See application file for complete search history.

(56) References Cited

U.S. PATENT DOCUMENTS

| | | | |
|---|---|---|---|
| 6,343,216 B1 | 1/2002 | Kim et al. | |
| 7,783,771 B2 * | 8/2010 | Pantalone | 709/230 |
| 2002/0098889 A1 | 7/2002 | Sato et al. | |
| 2004/0199645 A1 * | 10/2004 | Rouhi | 709/227 |
| 2005/0101337 A1 * | 5/2005 | Wilson et al. | 455/466 |
| 2005/0128048 A1 * | 6/2005 | Krzyzanowski et al. | 340/3.71 |
| 2005/0283532 A1 | 12/2005 | Kim et al. | |
| 2007/0143489 A1 | 6/2007 | Pantalone | |
| 2007/0203979 A1 * | 8/2007 | Walker et al. | 709/204 |
| 2009/0184924 A1 | 7/2009 | Uchida | |

FOREIGN PATENT DOCUMENTS

| | | |
|---|---|---|
| CN | 1289518 | 3/2001 |
| JP | 2000-269998 | 9/2000 |

(Continued)

OTHER PUBLICATIONS

Korean Office Action dated Oct. 7, 2015 issued in counterpart application No. 10-2010-0001932, 6 pages.

(Continued)

*Primary Examiner* — Amir Mehrmanesh
(74) *Attorney, Agent, or Firm* — The Farrell Law Firm, P.C.

(57) ABSTRACT

Disclosed is a method and apparatus for processing multiple inputs from a plurality of users in a home network. A control point requests electronic devices in the home network to transmit input capability information, receives the input capability information as a response to the request from the electronic devices, and performs session setup using the input capability information by determining a receiver for receiving input signals and at least two senders for sending input signals. The control point transmits input signals transmitted by the at least two senders to the receiver.

8 Claims, 8 Drawing Sheets

(56) References Cited

FOREIGN PATENT DOCUMENTS

| | | |
|---|---|---|
| JP | 2002-140154 | 5/2002 |
| JP | 2007-121966 | 5/2007 |
| JP | 2008-090563 | 4/2008 |
| KR | 1020050033985 | 4/2005 |
| KR | 1020060112139 | 10/2006 |
| KR | 1020080021430 | 3/2008 |
| WO | WO 01/86393 | 11/2001 |

OTHER PUBLICATIONS

European Search Report dated Oct. 8, 2015 issued in counterpart application No. 10823593.8-1853, 7 pages.

* cited by examiner

APPARATUS AND METHOD FOR PROCESSING MULTIPLE INPUTS OF USERS OF A HOME NETWORK

PRIORITY

This application claims priority under 35 U.S.C. §119(a) to Korean Patent Applications filed in the Korean Intellectual Property Office on Oct. 12, 2009 and Jan. 8, 2010 and assigned Serial Nos. 10-2009-0096911 and 10-2010-0001932, respectively, the disclosure of each of which is incorporated herein by reference.

BACKGROUND OF THE INVENTION

1. Field of the Invention

The present invention relates generally to a Universal Plug and Play (UPnP) and, more particularly, to a method and apparatus for processing a plurality of inputs transmitted by respective input devices when there is a plurality of input devices having built-in UPnP services.

2. Description of the Related Art

Various Human Interface Devices (HIDs) are used to control computing devices such as a Personal Computer (PC), a laptop computer and a Personal Digital Assistant (PDA). The HIDs include a general input device such as a keyboard or a mouse, an input device such as a joystick or a game pad used for games, and an input device such as a stylus for a professional designer. There are numerous input devices according to the purposes of an input device.

To receive input data transmitted by various input devices, a host device should be equipped with various drivers which can receive and interpret inputs of the input devices. When an input device is connected to a host device, the host device interprets and uses input data interpreted by the driver. When a host device does not know which input device is to be connected thereto, it should include all types of device drivers or a user should install a driver suitable for the connected input device.

To solve such a problem, a Universal Serial Bus (USB) has been used which is designed to be easily applied even if a new type of an input device is adopted. The USB divides all input devices used in the market into classes according to types of the input devices. Each class driver manages a specific class device. A class such as an HID transmits a report descriptor which defines a data format to be transmitted by an input device.

The USB input device has an advantage of controlling various input devices using a single port and a class driver. However, the USB input device is restricted to a wired connection. To overcome such a limitation, the Bluetooth Special Interface Group (SIG) and USB standard group have developed standard techniques such as Bluetooth HID profile and wireless USB, thereby providing a method which can wirelessly connect a HID to a host device.

However, the above techniques connect an existing HID to provide a single function and simply extend a conventional wired function to a wireless environment. Moreover, the above techniques do not include functions which can solve problems considered in a wireless or network environment, and fail to provide flexibility for new functions.

Recently, mobile devices such as cellular phones and PDAs are provided with powerful processing capabilities compared with conventional devices and are designed to be able to easily access a wireless network. Based on this trend, the UPnP telephony Working Committee (WC) defines a service which may use one device as an input device of another device to use a network.

Said service is currently supporting a similar function to the Bluetooth HID profile case of mobile devices, but this service is not supporting functions considering the characteristics and examples of mobile devices.

As shown in FIG. 1, a general UPnP input device using UPnP includes two input devices 120 and 130 and an input configuration Control Point (CP) 110. The input devices 120 and 130 include input functions 121 and 131 of an Operating System (OS), input configuration services 122 and 132, and transfer servers/clients 123 and 133. The transfer servers/clients 123 and 133 operate as servers or clients and transmit input information. The input configuration CP 110 discovers the input configuration services 122 and 132 on a network and may set input types and necessary information, which can be processed by each input device and each receiving device. One of the input configuration services 122 and 132 transmits input data and the other thereof receives the input data. The input configuration CP 110 functions to transmit, to each service, a format and transmission method of input data to ensure interoperability between data to be transmitted by a sender and data to be received by a receiver.

Referring to FIG. 2, the input configuration CP 110 receives input capabilities of the input devices 120 and 130 through the input configuration services 122 and 132, in step 210. The input configuration CP 110 determines a receiver and a sender, and determines transport protocols in step 220, based on the received input capabilities. The input configuration CP 110 establishes sessions of the input devices 120 and 130 in steps 230 and 240. The CP 110 starts sessions of the input devices 120 and 130 to start transmission of input data between the two devices in steps 250 and 260.

A USB HID has been widely used for connection of various input devices. When a USB device is inserted into a host device, the host device recognizes each HID through an enumeration process, receives a report descriptor which is a format of input data, and receives the input data through a USB pipe.

The Bluetooth profile is a standard established by the Bluetooth SIG to extend an existing USB HID to a wireless environment. The Bluetooth profile discovers a service through a Service Discovery Protocol (SDP) defined in Bluetooth and transmits data through a Bluetooth data transport channel. A protocol for transmitting data is defined in a Bluetooth HID with reference to a request of a USB and the transmitted data is transmitted to an existing USB class driver.

However, the above-described conventional techniques have the following problems.

First, since only a single input device is considered, there is no reference for simultaneously processing input data when a plurality of input devices is connected. Accordingly, collision may occur between inputs.

Second, in existing input devices, one input device transmits only a determined type of an input. For a UPnP input device, one input device can transmit many types of inputs and even functions to receive inputs. When there are various input devices, since references for simultaneously processing transmitted inputs may differ according to types of input devices, a method for setting different references must be provided for each input type change.

SUMMARY OF THE INVENTION

The present invention addresses the above-mentioned problems and/or disadvantages and provides the advantages described below. An aspect of the present invention provides an apparatus and method for setting and changing processing schemes of multiple inputs transmitted by respective input devices according to a user's intention and automatically selects a processing schemes of a preset reference when there are a plurality of input devices having built-in UPnP input configuration services.

In accordance with an embodiment, a method is provided for processing multiple inputs from a plurality of users of a home network, the method including requesting, by a control point, electronic devices in the home network to transmit input capability information and receiving the input capability information as a response to the request from the electronic devices, performing session setup using the input capability information by determining a receiver for receiving input signals and at least two senders for sending input signals, setting, by the receiver, an input signal processing scheme upon receiving input signals from the at least two senders, and transmitting input signals transmitted by the at least two senders to the receiver.

In accordance with another embodiment, an apparatus is provided for processing multiple inputs from a plurality of users, the apparatus includes a receiving part for receiving input signals transmitted by at least two senders, a received input processing part for classifying or blocking the input signals of the at least two senders received through the receiving part according to a preset input signal processing scheme, and a received input transmitting part for processing the input signals and changing the processed input signals to input signals of a receiver, with an input configuration service that controls the receiving part, the received input processing part and the received input transmitting part.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EMBODIMENTS OF THE INVENTION

Figure 1:
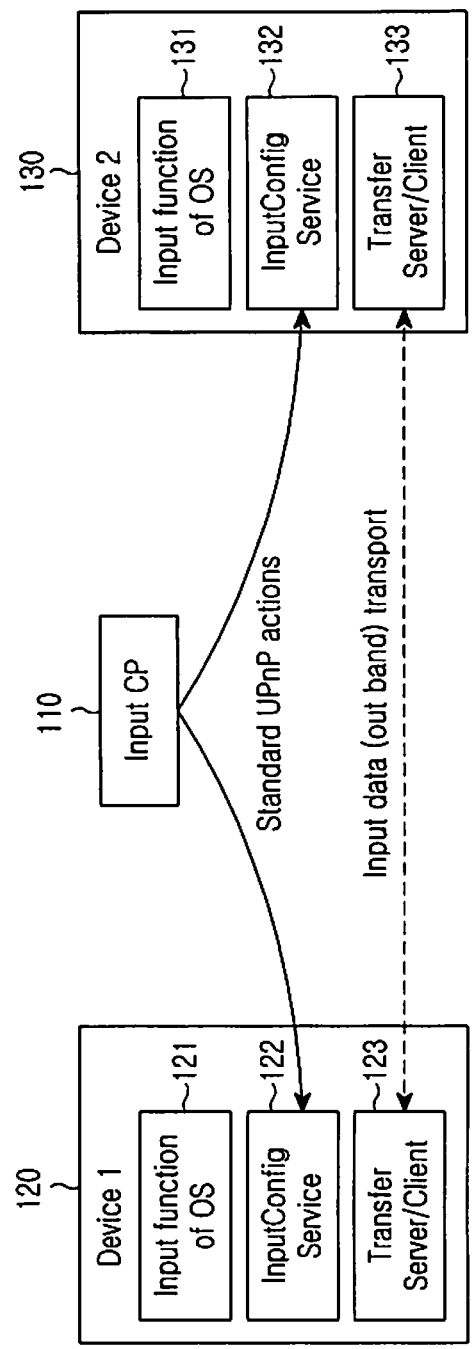
FIG. 1 illustrates a configuration of a conventional UPnP input device for a single input.
Figure 2:
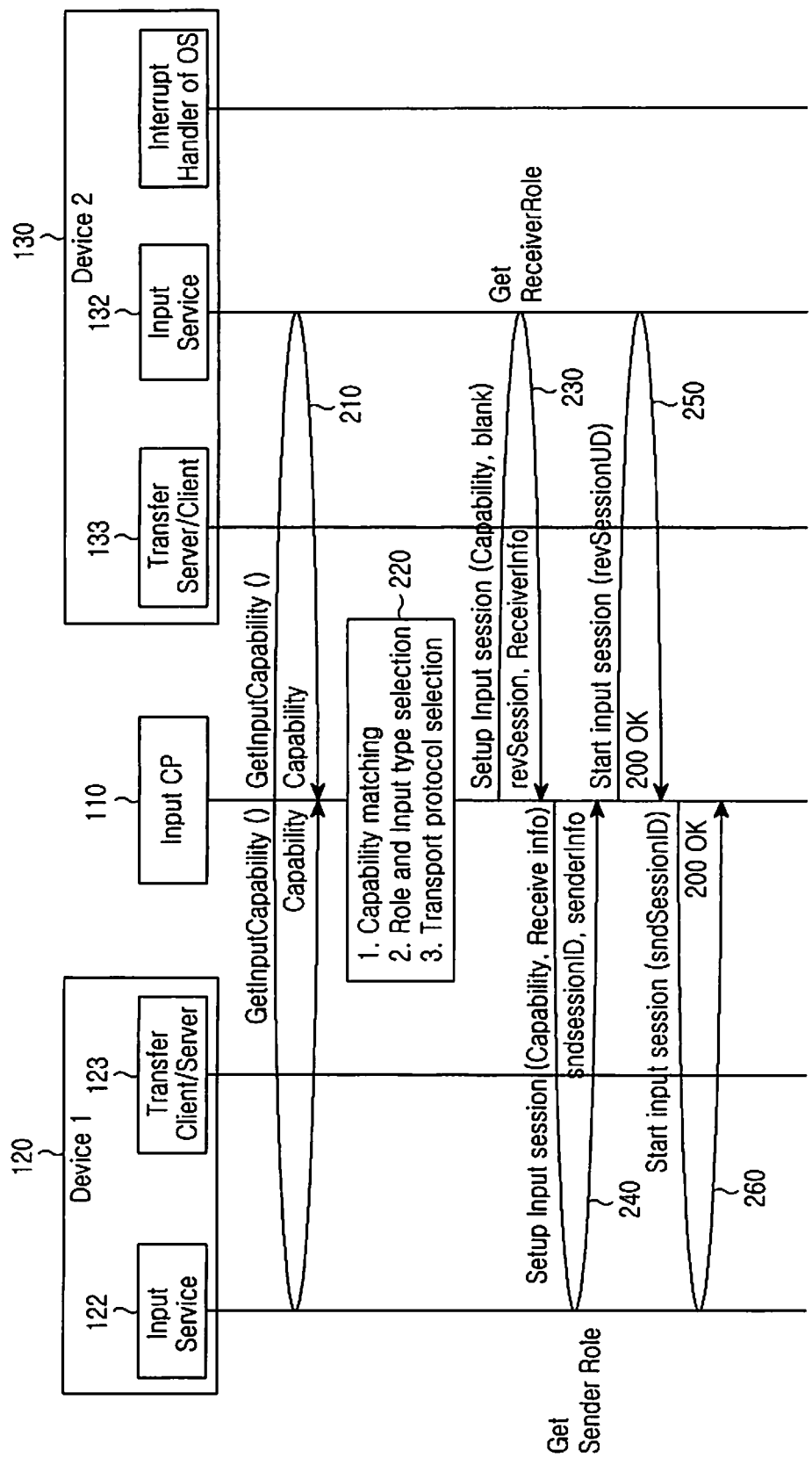
FIG. 2 is a flow chart illustrating an operation of a conventional UPnP input device for a single input.

Reference will now be made in detail to various embodiments of the present invention with reference to the accompanying drawings. The following detailed description includes specific details in order to provide a thorough understanding of the present invention. Throughout the drawings, the same drawing reference numerals will be understood to refer to the same elements, features and structures. However, it will be apparent to those skilled in the art that the present invention may be practiced without such specific details.

Figure 3:
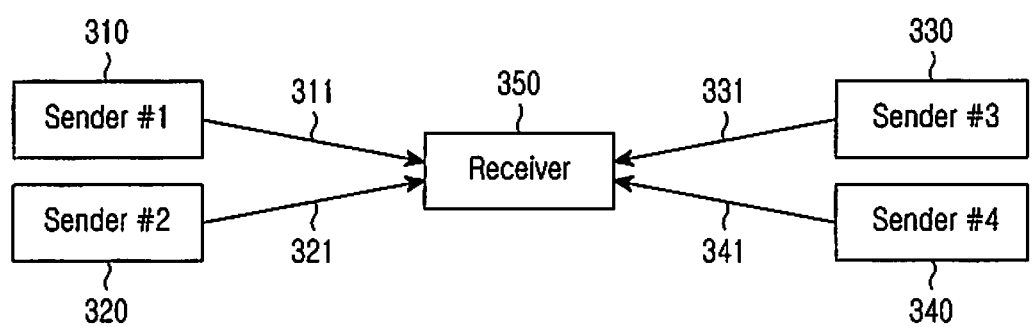
FIG. 3 is a block diagram illustrating input of signals received from a plurality of input devices through a UPnP input device.

The present invention provides a method to set and change processing schemes of multiple inputs 311, 321, 331, and 341 transmitted to a receiver 350 by respective senders 310, 320, 330 and 340 according to a user's intention and can automatically select the processing schemes by a preset reference, when there is a plurality of senders 310, 320, 330 and 340 having built-in UPnP input configuration services, as shown in FIG. 3.

Figure 4:
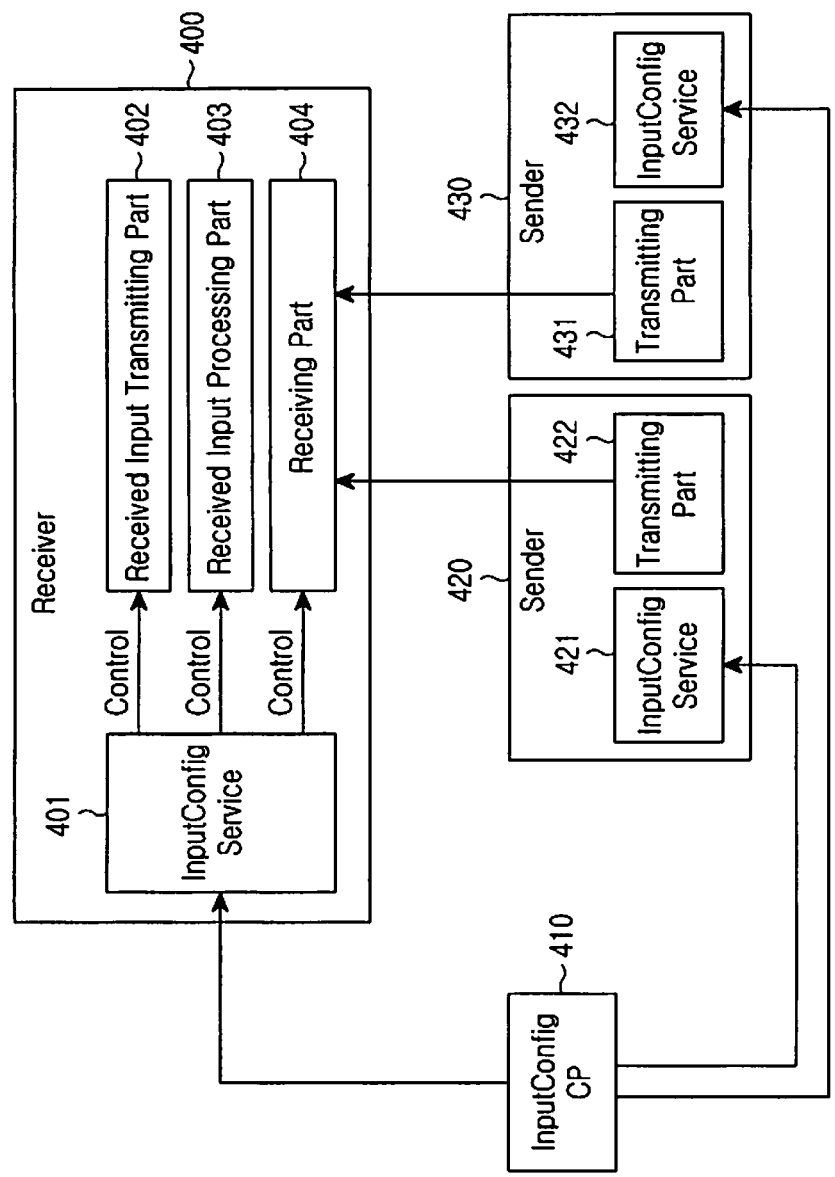
FIG. 4 is a block diagram illustrating a configuration of an apparatus for processing multiple inputs according to an exemplary embodiment of the present invention.

Referring to FIG. 4, a receiver 400 for receiving a plurality of input signals includes an input configuration service 401, a received input transmitting part 402, a received input processing part 403 and a receiving part 404. Senders 420 and 430 for transmitting input signals respectively include input configuration services 421 and 431 and transmitting parts 422 and 431.

An input configuration CP 410 connects the input configuration services 421 and 432 of the senders 420 and 430 to the input configuration service 401 of the receiver 400 and is in charge of a control functions including search or connection of input devices between senders 420 and 430 and the receiver 400. The input configuration service 401 of the receiver 430 400 and the input configuration services 421 and 432 of the senders 420 and 430 configure input devices of the receiver and the senders according to configuration of the input configuration CP 410 and control data which is input and received by a user.

The received input transmitting part 402 processes inputs transmitted by the senders 420 and 430 through the receiving part 404, changes the processed inputs to inputs of the receiver 400, and transmits the changed inputs to an OS of a device. The received input processing part 403 classifies or blocks inputs transmitted through the receiving part 404 according to a user's intention or a preset reference.

The input configuration service 401 includes a status parameter such as MultipleInputStatus indicating a status of a multiple-input mode. A user may change an input status of the receiver 400 through an UPnP action such as ChangeMultipleInputMode( ).

If a user does not set a mode, the receiver 400 is basically set to Mode 2, as described below, and, in case of the same type of inputs, recognizes the inputs as one input without distinguishing the inputs. For example, if a plurality of input devices serving as a mouse are connected to the receiver 400, a mouse pointer of the receiver 400 responds to all the respective input devices.

Figure 5:
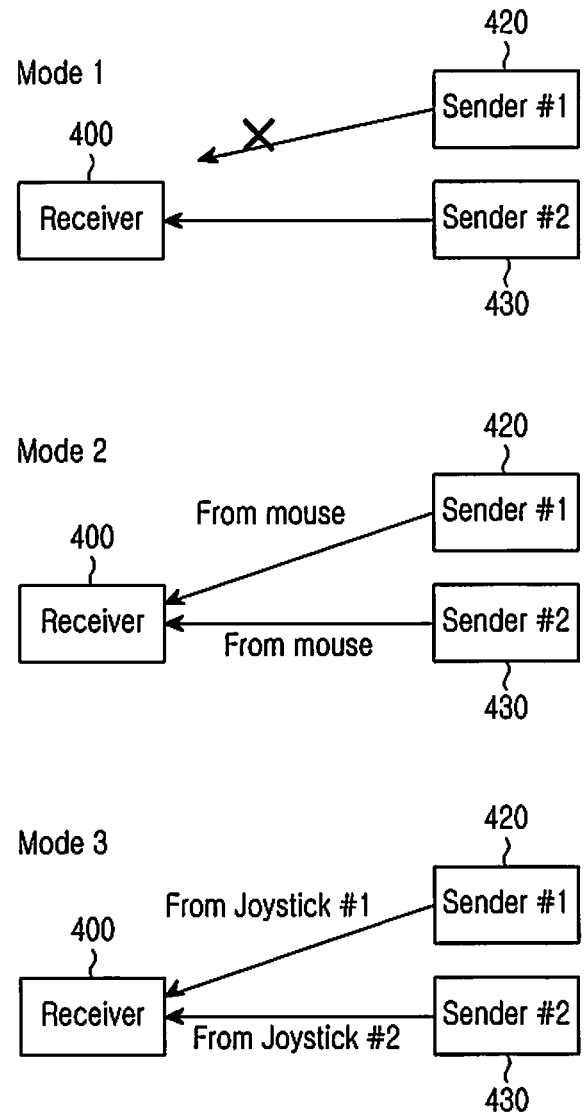
FIG. 5 illustrates an input situation when a plurality of input devices performs inputs.

A method for processing a user input is divided into three modes as shown in FIG. 5, and described below.

Mode 1 refers to a mode in which a user of one input device, for example, the sender 430, can exclusively transmit an input to the receiver 400. A USB mouse or a Bluetooth keyboard is a device which is subordinate to a PC. However, a mobile device, which is a target device of an input configuration service, is not subordinate to the receiver 400 and may be connected or disconnected to the receiver 400 as the need arises. Accordingly, there is a disadvantage of arbitrary manipulation of the receiver 400 at any time by anyone. To prevent this problem, a user may inform the receiver 400 using a CP that the currently used sender 430 is an exclusive device which is in charge of an input of the receiver 400.

In Mode 2, as shown in FIG. 5, the receiver 400 independently uses inputs of all the senders 420 and 430. Namely, if two mouse inputs are received, the receiver 400 processes all the two inputs. Similarly, if two or more mice are connected to a PC, the PC responds to the respective mouse inputs. Mode 2 provides the same User Experience (UX) as currently used HID devices. Therefore, the receiver 400 configures Mode 2 as a default mode if there is no mode change by a CP.

In Mode 3, as shown in FIG. 5, the receiver 400 discriminates between inputs of all the senders 420 and 430. Namely, if two joystick inputs are received, the receiver 400 discriminates between the two inputs, to distinguish between respective inputs such as two users playing a game, each using a joystick.

Figure 6:
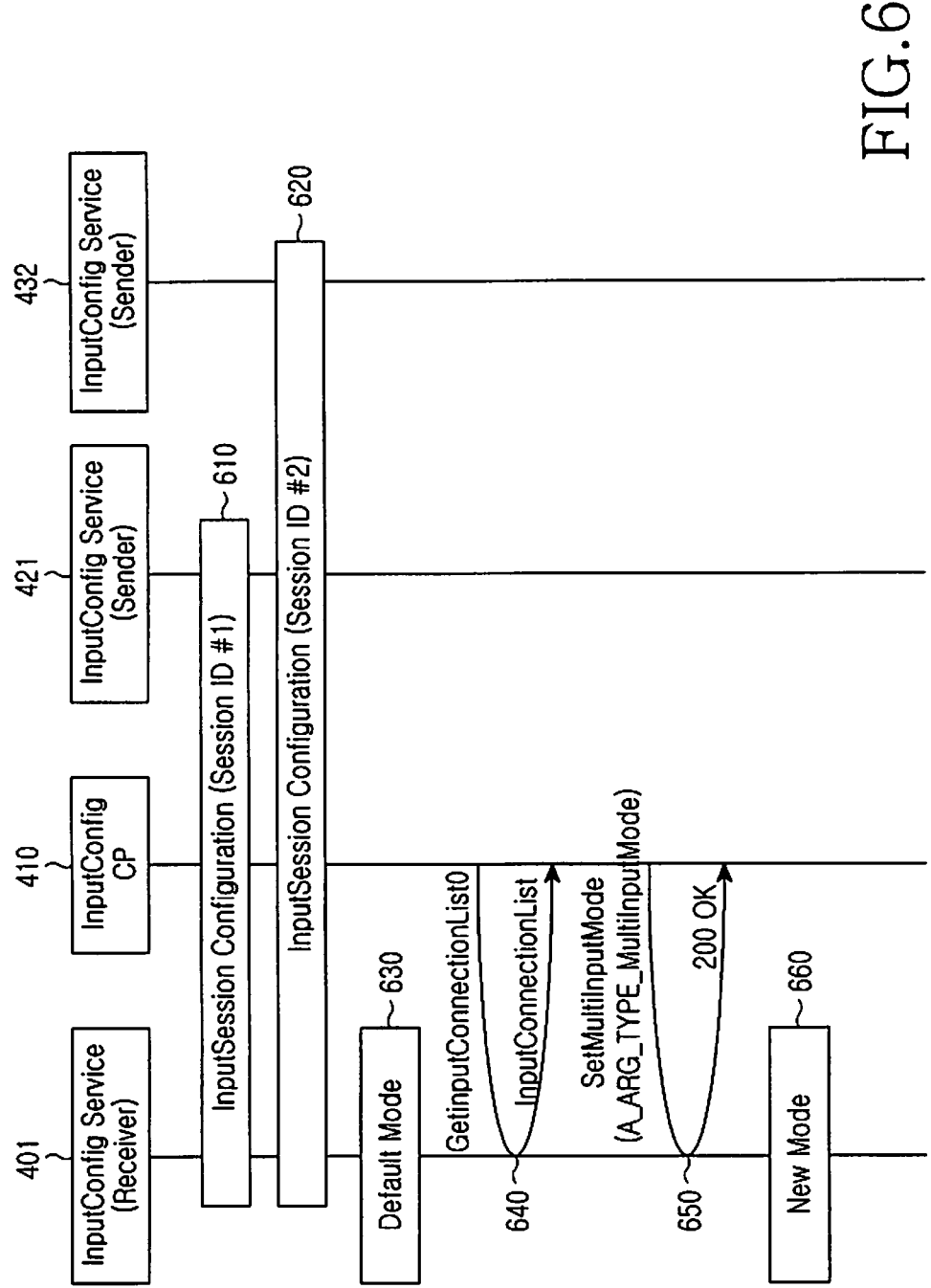
FIG. 6 is a flow chart illustrating an operation for setting a mode to a default mode according to an exemplary embodiment of the present invention.

Referring to FIG. 6, a user establishes input sessions in a plurality of devices using the CP 410 and assigns Identifiers (IDs) to the respective sessions in steps 610 and 620. In step 630, when a plurality of sessions is firstly established, a mode is set to Mode 2, which is a default mode.

If a user desires to change the mode, the CP 410 may receive an InputConnectionList of the receiver 400 using GetInputConnectionList( ) in step 640. InputConnectionList includes a current mode. The CP 410 confirms the current mode and sets the mode to a new mode using SetMultiInput-Mode( ) in step 650.

In the following Table 1, eXtensible Markup Language (XML) shows an example of a status parameter InputConnectionList representing information of the sender 420 connected to the receiver 400 and session information. The CP 410 confirms current session information using Table 1, and ends, activates or inactivates the sessions.

The session information preferably includes an input processing scheme, that is, mode information such as InputConnectionList@multipleInputMode when inputs are received from a plurality of input devices. A receiver processes a plurality of inputs according to the information.

If a current mode is a monopolized mode, InputConnectionList@multipleInputMode has a value of 1 and InputConnectionList@monopolizedDevice has a uuid of a monopolized receiver as a value. InputConnectionList@monopolizedSession has an ID of a monopolized session as a value.

TABLE 1

```
<?xml version="1.0" encoding="UTF-8"?>
<InputConnectionList
    xmlns="urn:schemas-upnp-org:telephony:ics:icl"
    xmlns:xsi="http://www.w3.org/2001/XMLSchema-instance"
    xsi:schemaLocation="urn:schemas-upnp-org:telephony:ics:icl
    http://www.upnp.org/schemas/telephony/ics-v1-icl.xsd">
    <multiInputMode>1</multiInputMode>
    <monopolizedDevice>6E09886B-DC6E-439F-82D1-
7CCAC7F4E3B4</monopolizedSession>
    <monopolizedSession>1</monopolizedSession>
    <peerDeviceList>
        <peerDevice        uuid="E09886B-DC6E-439F-82D1-
7CCAC7F4E3B4">
            <role>Sender</role>
            <sessionList>
                <session sessionID="1">
                    <inputType>TEXT</inputType>
                    <sessionStatus>Active</sessionStatus>
                    <peerSessionID>7</peerSessionID>
                </session>
            <sessionList>
        </peerDevice>
        <peerDevice        uuid="E09886B-DC6E-439F-82D1-
7CCAC7F4E3B5">
            <role>Receiver</role>
            <sessionList>
                <session sessionID="2">
                    <inputType>coodinate</inputType>
                    <sessionStatus>Idle</sessionStatus>
                    <peerSessionID> </peerSessionID>
                </session>
```

TABLE 1-continued

```
            <sessionList>
        </peerDevice>
    </deviceList>
</InputConnectionList>
```

Figure 7:
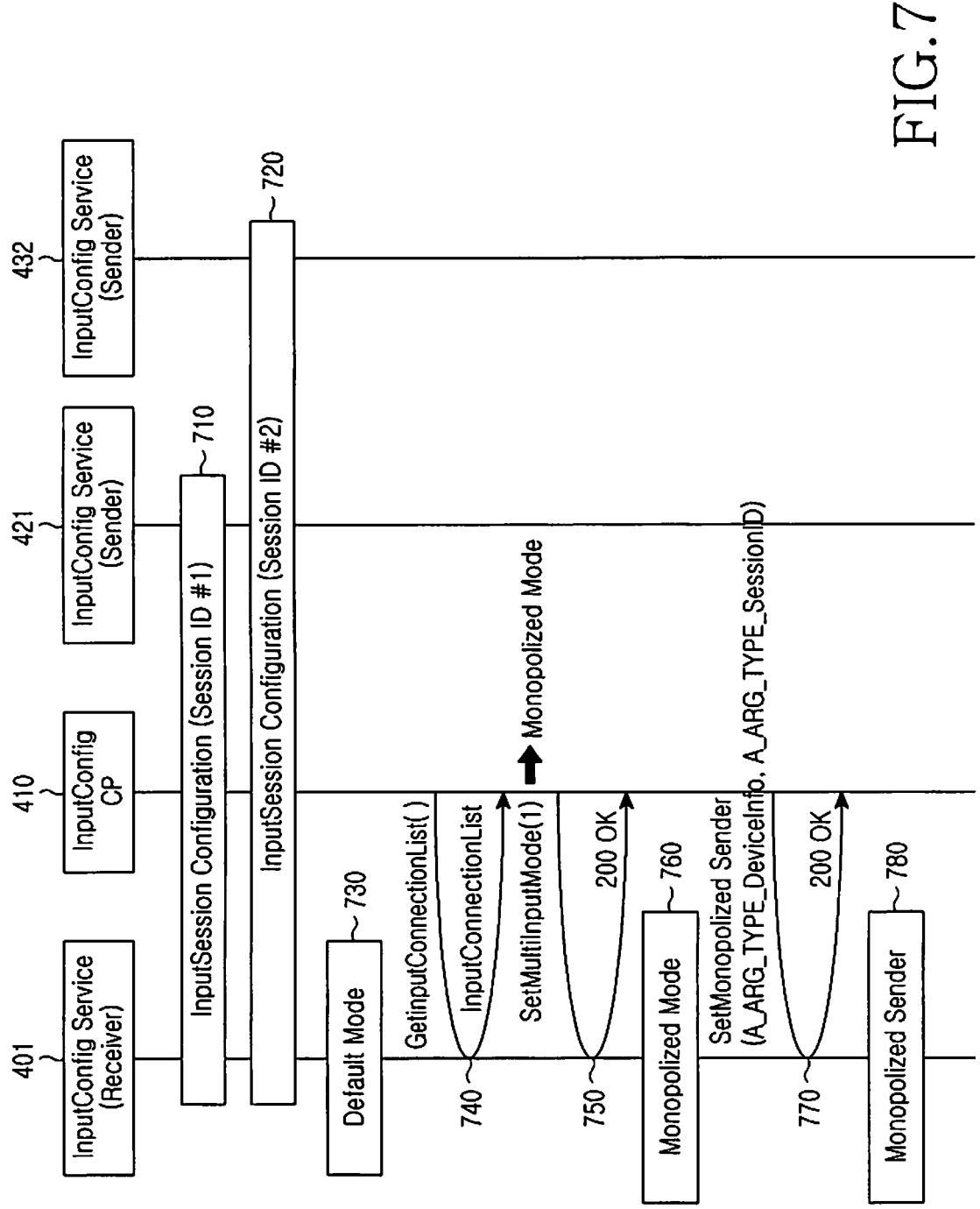
FIG. 7 is a flow chart illustrating an operation for setting a mode to a monopolized mode according to an exemplary embodiment of the present invention.

Referring to FIG. 7, an operation performed until a user sets a mode is similar to the mode setting operation described with reference to FIG. 6 and therefore a description thereof is omitted. However, even though a mode is set to Mode 1, the mode should be set through SetMonopolizedSender( ) which device acquires ownership. In step 770, the CP 410 transmits uuid of a monopolized device and an ID of a monopolized session within the monopolized device to the receiver 400 through SetMonopolizedSender( ).

Next, inputs except for inputs by the monopolized sender are blocked by the received input processing part 403. If a specific sender has a monopoly on inputs, other senders cannot acquire the monopoly before the specific sender enters a release status. A monopolized position may be set such that other senders cannot acquire the position before an associated sender enters a release status and the position is released when a sender does not transmit an input for a prescribed time period.

Figure 8:
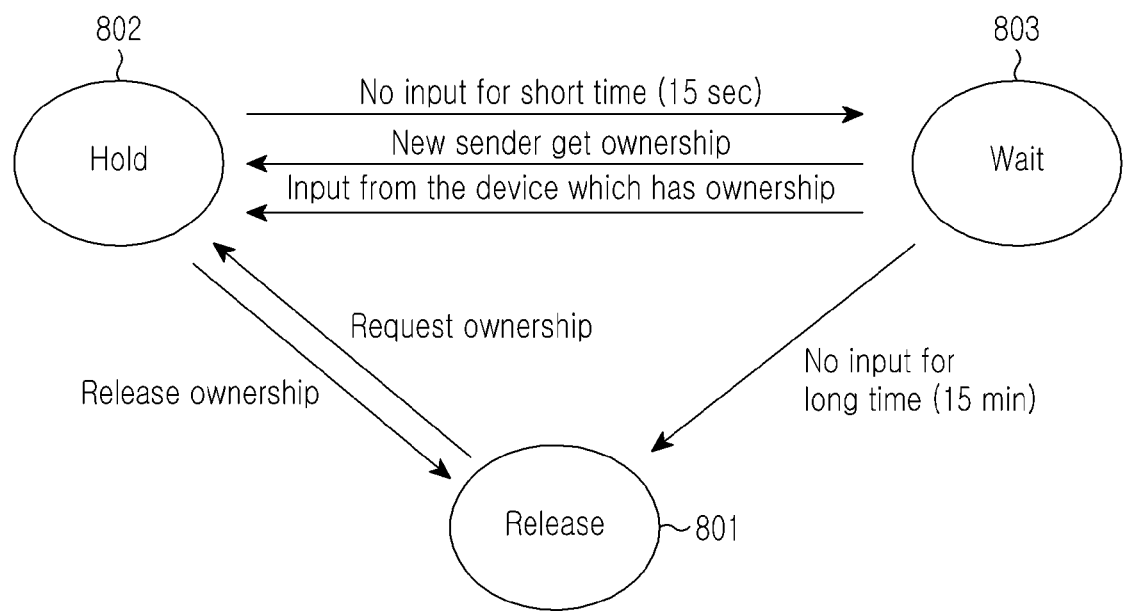
FIG. 8 is a state diagram for the receiver shown in FIG. 4 according to an embodiment of the present invention.

FIG. 8 is a state diagram for the receiver shown in FIG. 4 according to an embodiment of the present invention.

In FIG. 8, the default state of the receiver is release state 801 indicating that there is no monopolized sender. A CP may transmit information about a specific sender to the receiver through an action such as SetMonopolizedSender( ) so that the receiver assigns ownership to a sender. If a specific sender has ownership, the receiver enters hold state 802 and other senders cannot access the receiver. After a short time (for example, 15 seconds) in hold state 802, the receiver enters wait state 803. In wait state 803, ownership can be assigned to other senders. In wait state 803, if a new sender has ownership or a device having ownership moves, the receiver enters the hold state 802.

An operation of Mode 2 is started by searching for a device having an input configuration service by an input configuration CP. Devices are shown to a user as a result of possible combinations through an input capability matching process. The user determines a first sender and a receiver with reference to the result.

In Mode 3, the input configuration CP searches devices with an input configuration service as in Mode 2 and the devices are shown to a user as a result of possible combinations through an input capability matching process. The user determines a first sender and a receiver with reference to the result. Next, a second sender is added using the input configuration CP and a received input processing part transmits inputs transmitted by the first and second senders to a receiving input transmitting part using a method distinguished by an OS.

According to the above-described embodiments of the present invention, an input operation of a plurality of senders can be controlled when multiple users become input signal senders in the same place. For example, in the classroom, a host may assign a monopoly on an input device to a specific participant or may deprive the participant of the monopoly. Then the participant owns the monopoly and may perform a question and answer session by controlling an input signal receiver.

Further, it is possible to use a public device like a personal device by using the same device by changing a mode or to alternately use an input device by accessing a public device.

When a plurality of users plays games, inputs transmitted by respective mobile devices can be distinguished so that the mobile devices can be used instead of joysticks.

Although certain embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description above, but defined by the accompanying claims and equivalents thereof.

What is claimed is:

1. A method for processing multiple inputs from a plurality of senders in a home network, the method comprising:
   requesting, by a control point, electronic devices in the home network to transmit input capability information;
   receiving, by the control point, the input capability information from the electronic devices in response to the request; and
   when the electronic devices include a plurality of senders which transmit input signals to a receiver, performing, by the control point, session setup between the receiver and the plurality of senders using the input capability information by setting an input signal processing scheme for the receiver to classify or block input signals received from the plurality of senders, except for a select sender,
   wherein setting the input signal processing scheme comprises setting different references according to each input type change for each input signal received from the plurality of senders,
   wherein the receiver enters:
      a release state when a session is not established,
      a hold state when a session is established by a session setup request of the selected sender,
      a wait state when an input signal is not received for a first prescribed time period from the selected sender, and
      the release state when no input is received in the wait state for a second prescribed time period from the selected sender.

2. The method of claim 1, wherein an identifier (ID) is assigned to each session during the session setup.

3. The method of claim 1, wherein, while in the hold state, the receiver does not process input signals received from other senders except for the selected sender.

4. The method of claim 1, wherein, while in the wait state, the receiver enters the hold state upon receiving an input signal from the selected sender, and wherein, while in the wait state, ownership may be assigned to other senders besides the selected sender if input signals are received from those other senders, and the receiver may subsequently enter the hold state if ownership is established by those other senders.

5. A method for processing multiple inputs from a plurality of senders in a home network, the method comprising:
   receiving, by an electronic device connected to the home network, a request for input capability information from a control point;
   transmitting, by the electronic device, the input capability information as a response to the request to the control point;
   receiving, by the electronic device from the control point, an input signal processing scheme for blocking input signals received from the plurality of senders, except from a selected sender, wherein the control point set the input signal processing scheme by setting different references according to each input type change for each input signal received from the plurality of senders; and
   applying, by the electronic device, the input signal processing scheme to input signals received from the plurality of senders,
   wherein, according to the received input signal processing scheme, the electronic device enters:
      a release state when a session is not established,
      a hold state when a session is established by a session setup request of the selected sender,
      a wait state when an input signal is not received for a first prescribed time period from the selected sender, and
      the release state when no input is received in the wait state for a second prescribed time period from the selected sender.

6. An apparatus for processing multiple inputs from a plurality of senders, the apparatus comprising:
   a receiver configured to receive input signals in a home network;
   a received input processor configured to process input signals of a plurality of senders in the home network according to an input signal processing scheme for classifying or blocking input signals from the plurality of senders;
   a received input transmitter configured to change the processed input signals to input signals of the apparatus; and
   an input configuration server configured to control the receiver, the received input processor and the received input transmitter,
   wherein the input signal processing scheme sets different references according to each input type change for each input signal received from the plurality of senders, and
   wherein, when the input signal processing scheme is set for the receiver to block input signals received from the plurality of senders, except for a selected sender, the receiver enters:
      a release state when a session is not established,
      a hold state when a session is established by a session setup request of the selected sender,
      a wait state when an input signal is not received for a first prescribed time period from the selected sender, and
      the release state when no input is received in the wait state for a second prescribed time period from the selected sender.

7. A method for processing multiple inputs from a plurality of senders in a home network, the method comprising:
   requesting, by a control point, electronic devices in the home network to transmit input capability information;
   receiving, by the control point, the input capability information from one or more electronic devices in response to the request; and
   when the received input capability information indicates that there are a plurality of senders that transmit input signals in the home network, setting, by the control point using the received input capability information, an input signal processing scheme for a receiver to process input signals received from the plurality of senders to a first mode,
   wherein setting the input signal processing scheme comprises setting different references according to each input type change for each input signal received from the plurality of senders,
   wherein the first mode comprises receiving and processing input signals from a selected sender of the plurality of senders, and blocking the rest, and wherein, in the first mode, the receiver enters:
a release state when a session is not established,
a hold state when a session is established by a session setup request of the selected sender,
a wait state when an input signal is not received for a first prescribed time period from the selected sender, and
the release state when no input is received in the wait state for a second prescribed time period from the selected sender.

8. The method of claim 7, wherein the selected sender is a mobile device.

\* \* \* \* \*